US008406508B2

(12) United States Patent
Pollack et al.

(10) Patent No.: US 8,406,508 B2
(45) Date of Patent: Mar. 26, 2013

(54) REPRODUCIBLE THREE DIMENSIONAL VACUUM FORMING TECHNIQUE

(76) Inventors: Mark Pollack, Camarillo, CA (US); Anthony Jollett, Los Angeles, CA (US)

( * ) Notice: Subject to any disclaimer, the term of this patent is extended or adjusted under 35 U.S.C. 154(b) by 1090 days.

(21) Appl. No.: 12/352,531

(22) Filed: Jan. 12, 2009

(65) Prior Publication Data
US 2009/0180712 A1 Jul. 16, 2009

Related U.S. Application Data

(60) Provisional application No. 61/020,616, filed on Jan. 11, 2008.

(51) Int. Cl.
G06K 9/00 (2006.01)
(52) U.S. Cl. ...................................................... 382/154
(58) Field of Classification Search .................. 382/100, 382/154, 275, 294; 354/76, 77, 75, 290, 354/291, 292, 52; 355/22, 47; 396/429, 396/325, 267
See application file for complete search history.

(56) References Cited

U.S. PATENT DOCUMENTS

| 5,040,005 A * | 8/1991 | Davidson et al. ............. 396/429 |
| 5,363,159 A * | 11/1994 | Melvin .......................... 396/267 |
| 7,332,537 B2 * | 2/2008 | Bredt et al. ................... 524/423 |
| 7,555,157 B2 * | 6/2009 | Davidson et al. ............. 382/154 |
| 7,729,506 B2 * | 6/2010 | Carlson ......................... 382/100 |
| 7,968,626 B2 * | 6/2011 | Giller et al. ........................ 524/8 |

OTHER PUBLICATIONS

B. Brown and S. Rusinkiewicz. Global non-rigid alignment of 3-D scans. ACM (Proc. SIGGRAPH), 26(3), Aug. 2007.*

* cited by examiner

Primary Examiner — Andrae S Allison
(74) Attorney, Agent, or Firm — John Alumit

(57) ABSTRACT

A method of reproducing a three dimensional (3D) image by counter-distorting a two dimensional (2D) image prior to vacuum forming. A captured or obtained image of a subject is digitalized into 3D and 2D formats and used to create a 3D surface using a CNC machine. A standardized grid pattern with numerous reference points is printed on a vacuum formable material and vacuum formed on the 3D surface representing a subject. The reference points on the grid are displaced during the vacuum forming process due to the 3D nature of the surface. If the image of the subject were printed on the vacuum formable material, it would appear distorted. The displaced reference points are observed and the data is entered into the inventive software which generates a new image with compensated morphological changes. When the new image is vacuum formed on vacuum formable material under the same conditions, the new image would not appear distorted and would accurately depict the subject in 3D.

4 Claims, 4 Drawing Sheets

REPRODUCIBLE THREE DIMENSIONAL VACUUM FORMING TECHNIQUE

CROSS-REFERENCE TO RELATED APPLICATION

This application claims the benefit of the provisional patent application No. 61/020,616 filed on Jan. 11, 2008.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention generally relates to the method of obtaining multiple uniform three dimensional ("3D") vacuum formed images captured and generated from a two dimensional ("2D") or 3D subject.

Methods of creating 3D representations of subjects are known in the art. For example, U.S. patent application Ser. No. 10/605,446 to Tseng discloses a process for generating a 3D copy of a 3D subject made by combining a 3D custom milled shape and a 2D printed image of which is molded to the contours of the 3D custom milled shape. The custom milled shape is placed as a mold on a vacuum-forming machine. The plastic sheet is aligned to the custom milled shape wherein heat and vacuum pressure is applied to create the final 3D product.

It is common for printers to generate digital images on thermoplastics using vacuum formable ink. It is also common for engineering software to predict the vacuum forming distortion effects on vacuum formable inks. The common methods and processes of creating 3D representation entail impractical and expensive attempts through trial and error because each time an image is vacuum formed it is distorted and adjustments must be made. Other methods such as creating topographical maps of subjects entail great expense and difficulty. Creating accurately corresponding 3D representations of a captured 2D or 3D subject inexpensively and efficiently by digital image distortions interpretations, is a well known problem.

It is therefore an object of the present invention to solve the problem of producing an accurately corresponding 3D representation of an obtained 2D or 3D subject inexpensively and efficiently by the process of using a distortion reference template vacuum formed on a surface or material to determine reference point changes from which anticipated distortions are addressed using a different method and software, and to maintain the same conditions of vacuum forming by using registration marks.

SUMMARY

The present invention comprises a method of obtaining multiple uniform 3D vacuum formed images generated from a 2D or 3D image of a subject. According to one preferred embodiment of the invention, a subject is captured, obtained and made available for digital manipulation in 2D and 3D format. Utilizing these files and commercially available software, a physical 3D surface is machined on a die. Also, a grid with reference points and registration marks is created on thermoformable plastic skin. The thermoformable plastic skin is then vacuum formed over the 3D surface. The vacuum forming process causes the thermoformable plastic skin to stretch over the 3D surface, causing the reference points printed thereon to be displaced and the image to distort. The changes in reference point positioning are observed and entered into a software program designed to create a new image that will anticipate the changed positioning of the reference points during the second vacuum forming process. The new image will contain compensated morphological changes (i.e., a counter-distorted image) that will be used on subsequent thermoformable plastic skins. When the thermoformable plastic skin is again vacuum formed and stretched over the 3D surface, the counter-distorted image will distort, but this time will create an accurate depiction of the subject in 3D. To maintain the same conditions during each vacuum forming, registration marks are placed on both the 3D surface and the thermoformable plastic skin within the perimeters of the obtained image. If vacuum formed under the exact same conditions using similar material, the counter-distorted image will distort in the exact same way and no adjustments need be made. In an alternate embodiment, a grid may be created directly on the die surface, and then machined into a 3D surface, wherein the displaced positioning of the reference points after scanning are automatically applied to the image in electronic format for subsequent printing in the same manner as above.

DETAILED DESCRIPTION

Figure 1:
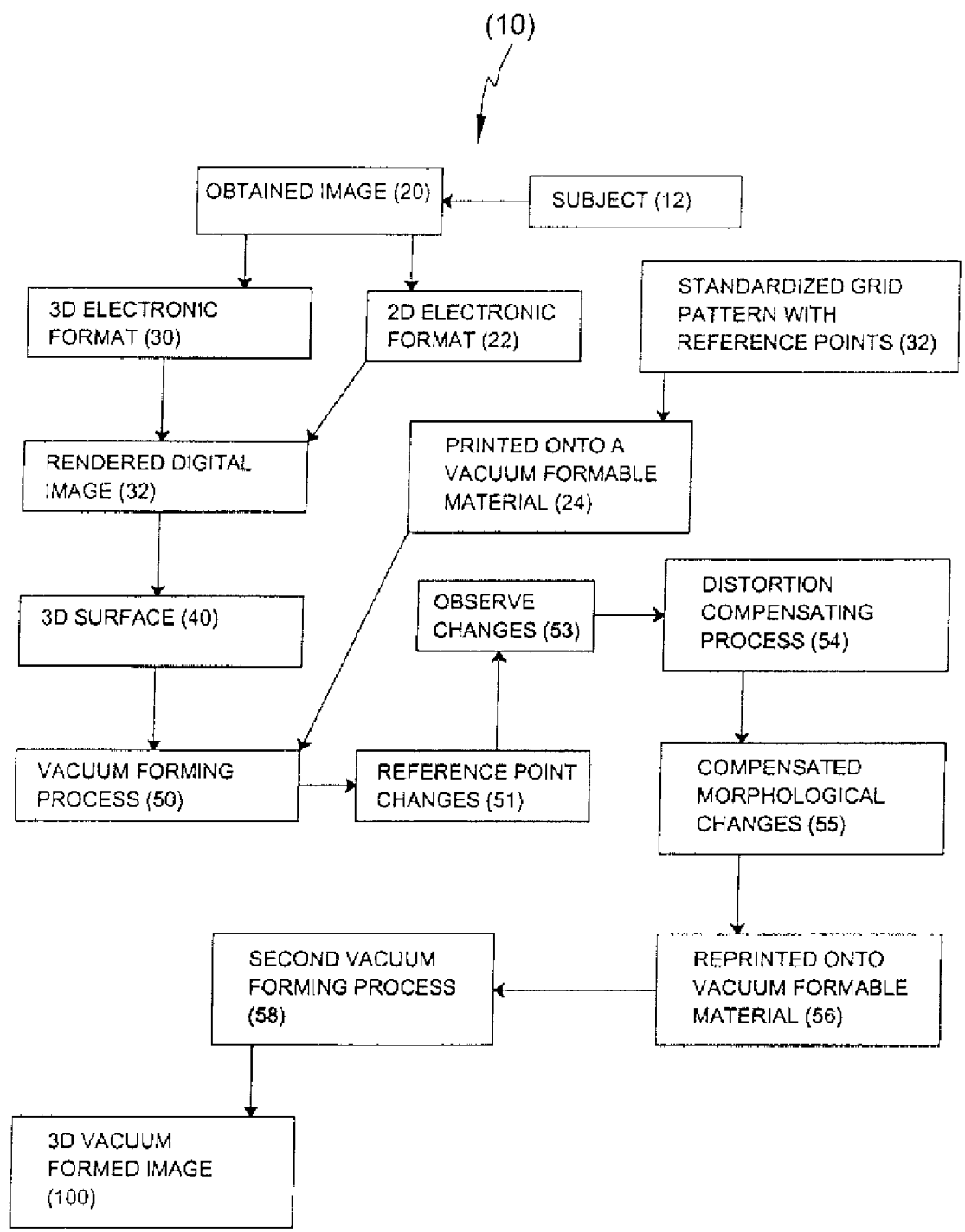
FIG. 1 is a block diagram showing steps of the inventive method.

Referring to FIG. 1, a method 10 of obtaining a 3D vacuum formed image 100 wherein the vacuum formed image 100 is capable of reproduction while retaining its accuracy, thereby allowing multiple identical vacuum formed images 100 to be subsequently created, is shown and described. In a preferred embodiment, the vacuum formed image 100 is based on a captured and obtained image 20 of a subject 12 such that the vacuum formed image 100 accurately reflects the three dimensional properties of the subject 12. The subject may be a person, object, or place, as long as it has 3D characteristics. The method 10 contains the operations described in the following details.

Still referring to FIG. 1, a method 10 of generating a 3D vacuum formed image 100 is shown. To begin, an image of a subject 12 is captured/obtained. The obtained image 20 is a 2D representation of the subject 12 which may have 3D characteristics, or may be a 3D representation of a subject 12 captured in 3D. The subject is fixed according to at least two registration marks 27 (shown in FIG. 3) within the perimeter of the obtained image 20, and is embodied in a 2D electronic format 22 or a 3D electronic format 30.

Referring to FIG. 1, the obtained image 20 in 3D electronic format 30 is rendered in 3D using commercially available software. The subject 12 represented in the 2D electronic format 22 may be digitally manipulated to accurately or alternately represent the desired subject or obtained image yet to be generated with three dimensionality. Image qualities from the 2D electronic format 22 and 3D electronic formats 30 contribute to a means of producing a 3D surface 40.

Still referring to FIG. 1, a 3D surface 40 is created from the digital images using the commercially available software. In a preferred embodiment, the 3D surface 40 may be created using foam or a die as a substrate by routing them into a 3D surface 40.

Figure 4:
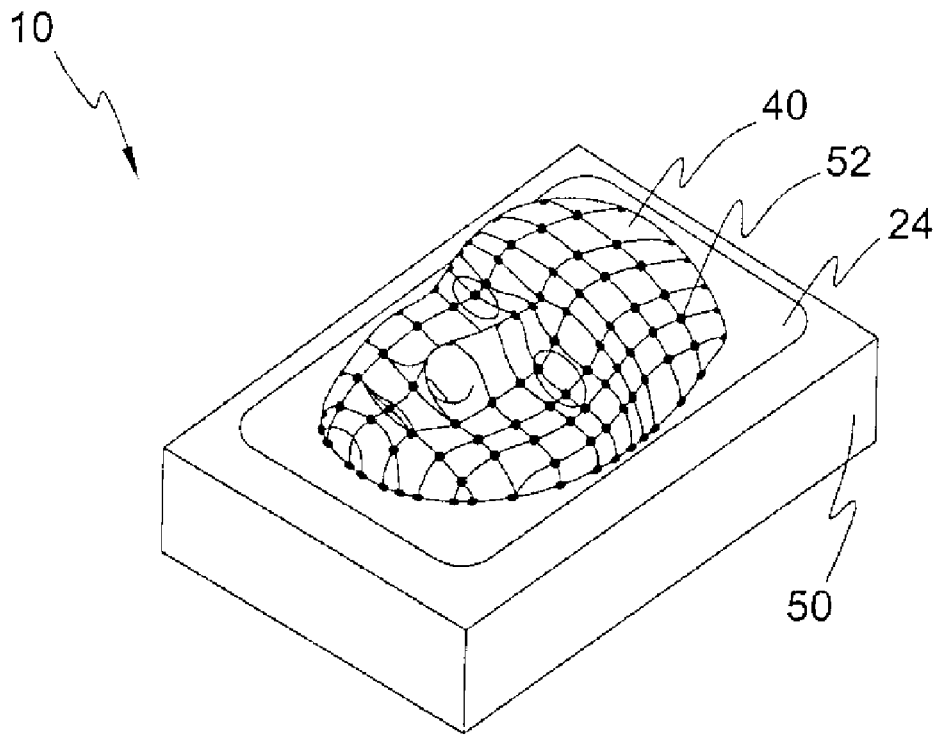
FIG. 4 is a vacuum formable material on a 3D surface undergoing reference point changes.

In FIG. 1 and as illustrated in FIG. 4 of the method 10, a base image with a standardized grid pattern including reference points 32 and registration marks 27 (shown in FIG. 1) is printed onto a vacuum formable material 24, including a thermoformable plastic skin. Next, the vacuum forming process 50 is performed, during which the vacuum forming process 50 will distort the grid pattern printed onto the vacuum formable material 24, as the vacuum formable material 24 bends and stretches over the 3D surface 40 (shown in FIG. 4). Because of the three dimensional nature of the 3D surface 40, certain reference points 52 of the grid pattern printed on the vacuum formable material 24 will be displaced. The base image will be distorted. If the image of the subject were contained on the base image, the morphological image of the subject would be distorted.

The thermoformable plastic skins may include any of the following: ABS (Standard and flame retardant), Polystyrene, High Impact Polystyrene, Cast Acrylic, Extruded Acrylic, PETG, Polycarbonate, Kydex brand flame retardant sheets, Expanded PVC, Ensolite brand PVC foam, Polyethylene, Polypropylene, or Minicel Brand L200 Ethylene-Ether Foam.

Still referring to FIG. 1, the reference point changes 51 are observed (53) and noted for future printing. The reference point changes 51 are scanned with commercially available 3D scanners and the data is used to adjust the morphology of the subject for subsequent image prints onto vacuum formable material 56. The inventive computer program may be used to compensate for the changes and would create a new image print representing a counter-distorted image. The compensated morphological changes 55 are printed onto new vacuum formable material and prepared for the second vacuum forming process 58 on the 3D surface 40. When the material is again stretched over the 3D surface 40, the counter-distorted image will distort into the desired 3D image. This distortion compensating process 54 may be repeated to increase the accuracy of the image printed on new vacuum formable materials 56; and is accomplished through the use of the inventive computer program.

To enhance the location of the reference points, the grid pattern may be individually color adjusted using digital imaging software for locating marks at intersection points on the grid pattern. Furthermore, high definition 3D laser scanners should be used such as a Next Engine 3D scanner with the ability to capture color surface texture such as the reference points and grid pattern.

Figure 2:
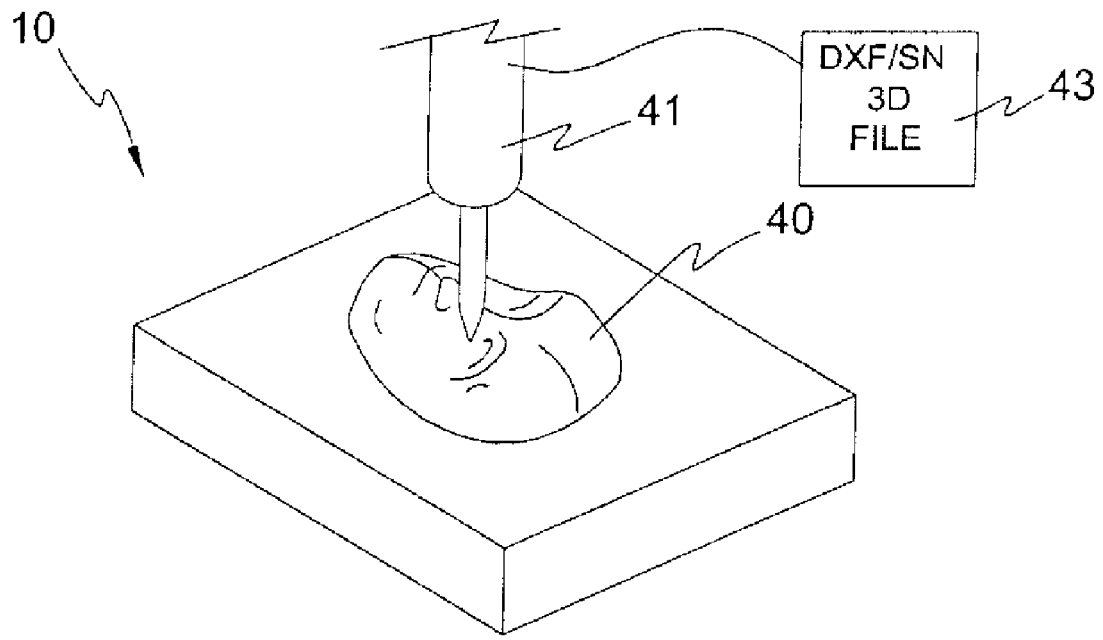
FIG. 2 is a system for creating a 3D surface.

Referring to FIG. 2, a preferred embodiment of the method 10, shows a computer numerically controlled (CNC) readable file 43 in connection with a CNC routing system 41 that creates the 3D surface 40 on a foam or die substrate, or any other commonly used materials in the field.

Figure 3:
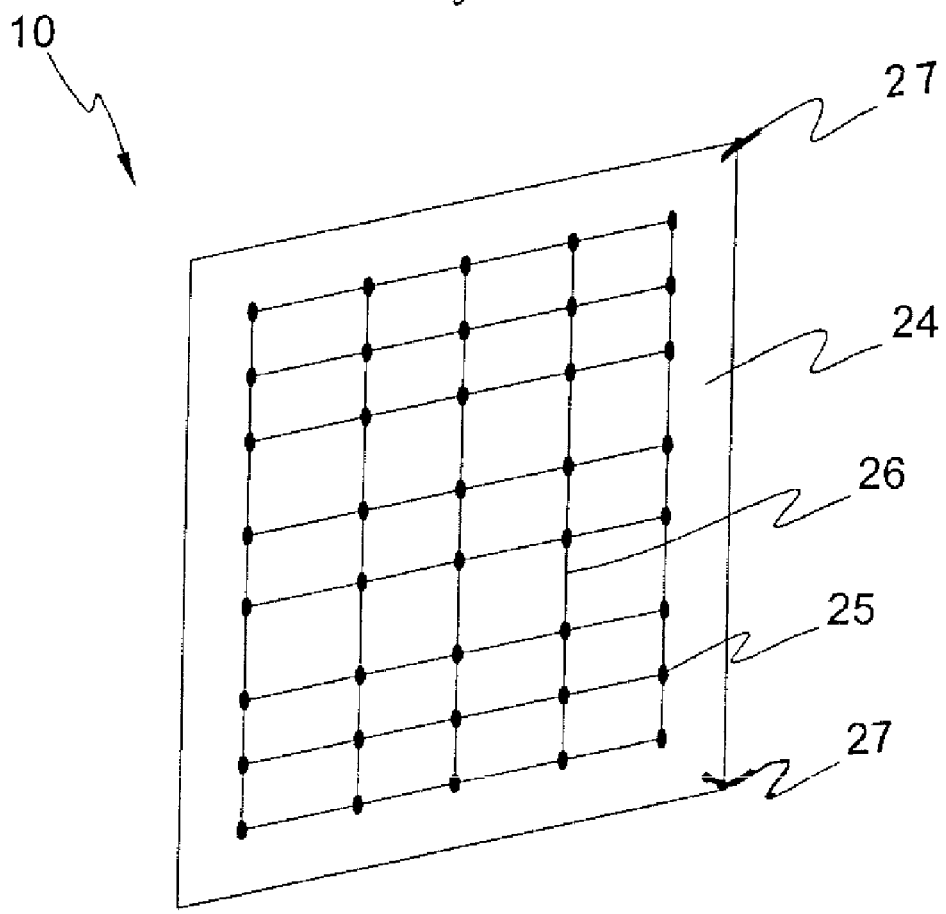
FIG. 3 is a vacuum formable material comprising reference marks and registrations points on a grid.

Referring to FIG. 3 of the method 10, a grid pattern printed onto a vacuum formable material 24 comprising registration marks 27 is shown. The registration marks 27 are necessary for proper placement of the grid pattern printed onto a vacuum formable material 24 over a 3D surface. In the preferred embodiment, the grid 26 (containing reference points 25) printed onto a vacuum formable material 24 is utilized for the first vacuum forming processes (shown in FIG. 4). The grid 26, reference points 25, and color are sized in resolution so that contour changes are accurately reflected when the grid 26 is distorted/stretched and scanned.

Figure 5:
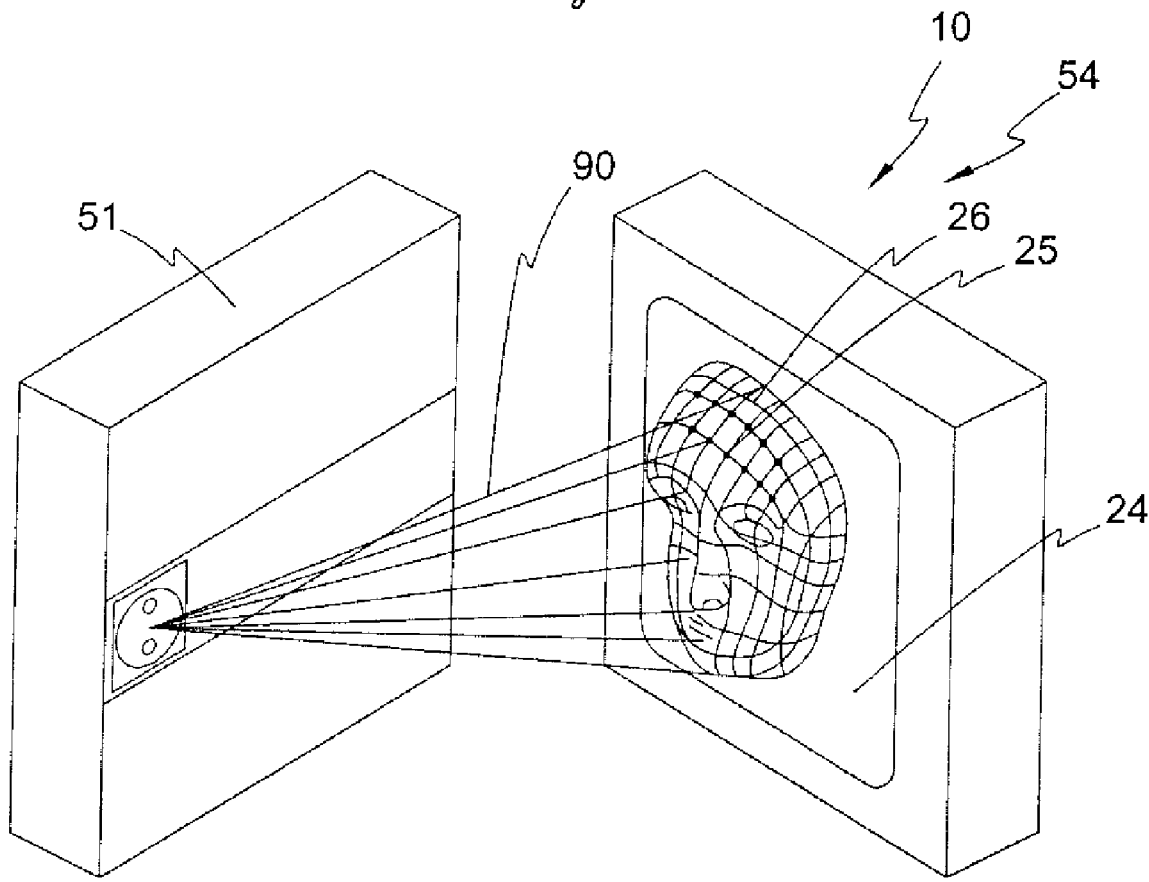
FIG. 5 illustrates the process of scanning reference points on a 3D surface.

Referring now to FIG. 5, a preferred embodiment of the method 10, illustrates the distortion compensating process 54 wherein the distortions are recognized. The method 10 comprises scanning the grid pattern that is printed onto a vacuum formable material 24 containing reference points 25 and grids 26, thermoformed to the 3D surface 40. In the current preferred embodiment a 3D scanner 51 uses lasers 90 to acquire and recognize the reference points 25 and grid 26 contained on the grid pattern printed onto vacuum formable material 24 and vacuum formed over a 3D surface. The 3D surface 40 scan data will be used in producing a compensated image and ultimately a desired 3D vacuum formed representation of the subject.

Figure 6A:
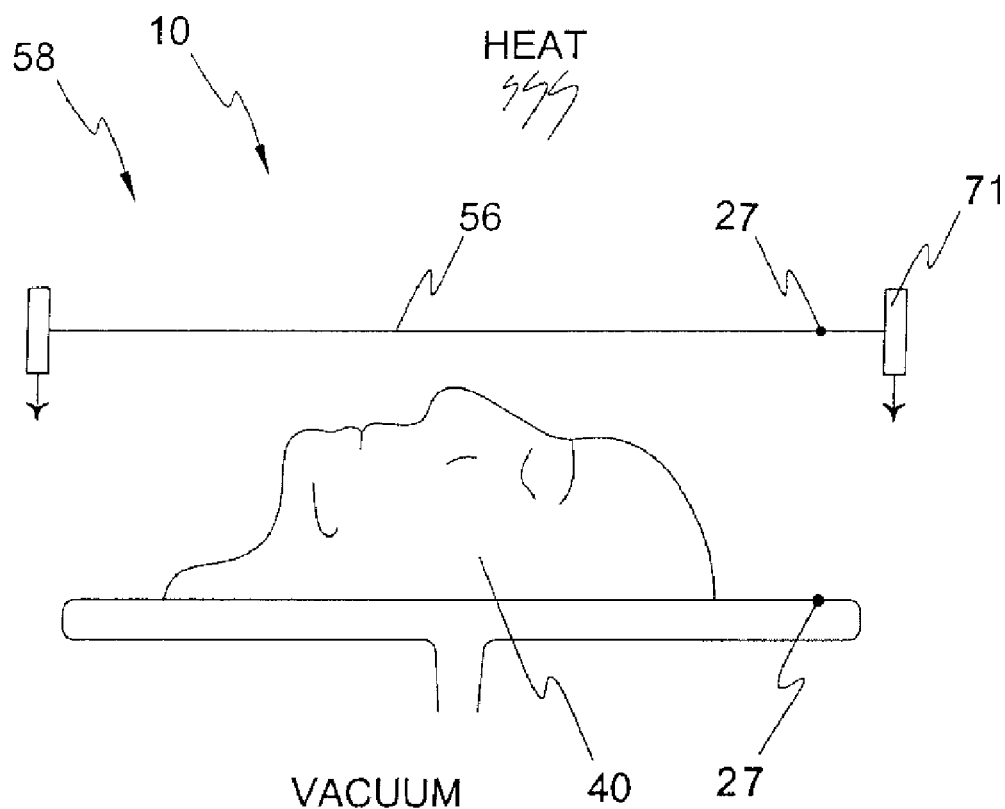
FIG. 6a is prior to the vacuum forming process utilizing positioning guides between the 3D surface and the vacuum formable material.

FIG. 6a of the method 10, illustrates the second vacuum forming process 58 in which HEAT is applied to the image printed on a vacuum formable material 56 in preparation for the vacuum forces to pull the soft material over the 3D surface 40 and aligning the registration marks 27. This second vacuum forming process 58 using the registration marks 27 as a guide between the 3D surface 40 and the printed image onto a vacuum formable material 56 embodying compensated morphological changes, also employs a fence or frame 71 to hold the printed vacuum formable material 56 in consistent alignment for future prints.

Figure 6B:
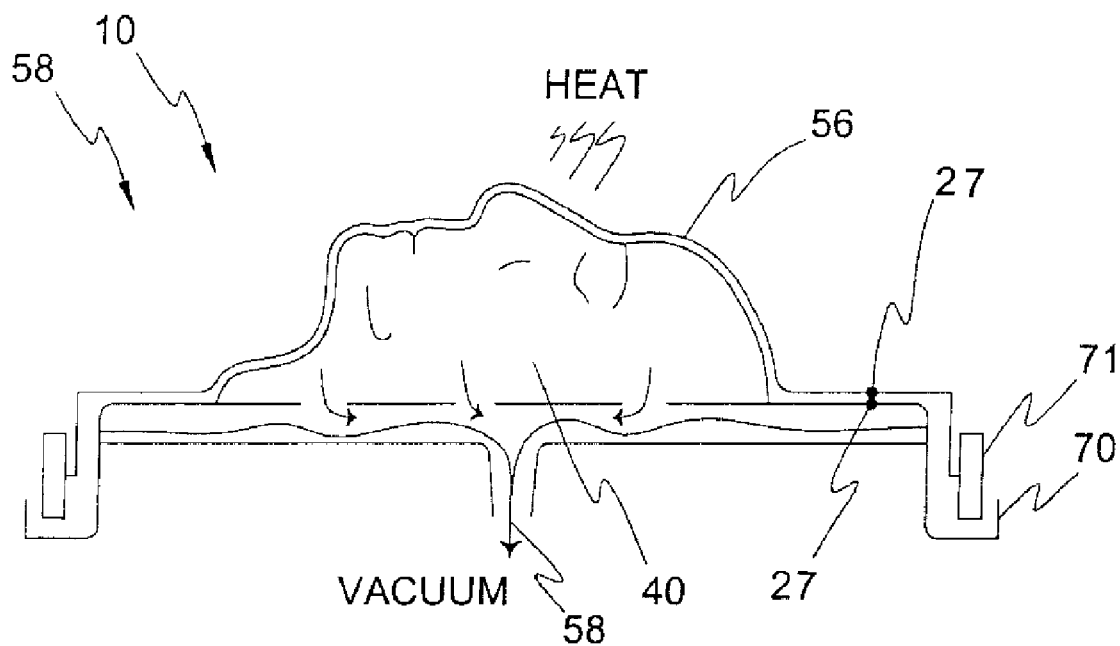
FIG. 6b is the vacuum forming process utilizing positioning guides between the 3D surface and the vacuum formable material.

Referring now to FIG. 6b of the method 10, the drawing illustrates how the vacuum formable material 56 containing the counter-distorted image, with compensated morphological changes, will undergo the second vacuum forming process 58 on the 3D surface 40 under the same conditions as did the grid pattern printed onto similar vacuum formable material 24 (shown in FIG. 3) in the first vacuum forming process. With the distortions compensated and the registration marks 27 aligned, an accurate 3D image of the subject will be reproduced each time. Multiple identical copies of a 3D vacuum formed representation of a subject may now be created.

In a preferred embodiment of the distortion compensating process, a novel software of the present invention is used as the means for compensating for expected morphological changes during the vacuum forming process based on data obtained from reference point displacement in the first vacuum forming process. A base image comprising a standardized grid pattern is used, wherein each reference point of intersection on the grid is recorded before and after the vacuum forming process to note changes in positioning of the reference points of intersection. The novel computer software of the present invention comprising the following processes is described in further detail.

In the preferred embodiment of the distortion compensating software, a three dimensionally vacuum formed grid is first identified for analysis. The 3D surface is scanned to generate corresponding texture files which are marked to appropriate the reference points used. Then the texture files are analyzed to correspond to the pixels and the original grid points, from which a new texture file is created representing the location of each of the grid points. In the next phase of the software, a new distortion model is created. For each grid point, corresponding polygons in the 3D model are identified. The software calculates the 3D point of the grid point pixel in the polygon, collects all 3D points in a list, and sorts and processes a list of 3D points to create a 2D array of points arranged according to the original grid. The software then applies texture coordinates to each 3D point based on 2D image pixel points, and exports a final distortion model.

In a preferred embodiment, the new distortion model may be created through the inventive software automatically and manually, or the same using any capable warping digital software.

Still referring to the current preferred embodiment of the distortion compensating software, a distortion model is now available for vacuum forming wherein the state of the model view is what any 2D image would look like if vacuum formed using the original form. In the next phase of the software, based on the distortion model, the user finds the corresponding texture point in the target model for each 3D point in the distortion model, and calculates the changes in reference points. The user separates the 2D image into grid units corresponding to the number of rows and columns in the distortion model. Each grid unit is then manipulated in the 2D image, and finally saved as a new 2D image.

In an alternate embodiment of the software process, any 3D model with textures may be created with the above process using only the corresponding part of the distortion model, continuing with additional subset target 3D models to generate a 2D image that when vacuum formed, will produce a result corresponding to the original target.

The inventive software may be stand alone or integrated with commercially available software as a plug-in.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A method of achieving a three dimensional (3D) surface representing a subject, the method comprising:
   a. generating a two-dimensional image, representing a three dimensional subject, including image reference points and registration marks;
   b. creating a three dimensional surface with reference points, including registration marks;
   c. vacuum forming the two dimensional image on the three dimensional surface;
   d. scanning the three dimensional surface to capture at least one reference point change on the two dimensional image grid pattern;
   e. compensating for the at least one reference point position change by altering the at least one electronic file representing the subject; and
   f. generating a second two-dimensional image with at least one compensated distortion correction, and vacuum forming the second two-dimensional image about a 3D surface.

2. The method of claim 1, wherein the grid pattern is individually color adjusted using digital imaging software for locating marks at intersection points on the grid pattern.

3. The method of claim 1, wherein the scanning system comprises high definition 3D laser scanners with the ability to capture color surface texture such as reference points and grid pattern, including Next Engine 3D scanner.

4. The method of claim 1, wherein the print comprises vacuum formable materials chosen from the list of ABS (Standard and flame retardant)r Polystyrene, High Impact Polystyrene, Cast Acrylic, Extruded Acrylic, PETG, Polycarbonate, Kydex brand flame retardant sheets, Expanded PVC, Ensolite brand PVC foam, Polyethylene, Polypropylene, and Minicel Brand L200 Ethylene-Ether Foam.

* * * * *